No. 880,888. PATENTED MAR. 3, 1908.
W. K. HOWE.
ELECTROMAGNET.
APPLICATION FILED APR. 26, 1906.
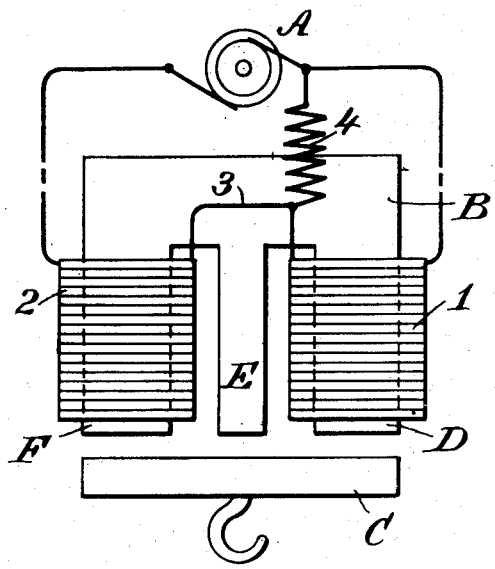
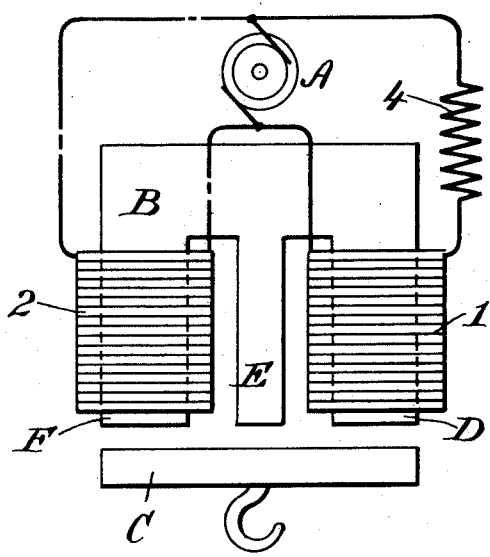
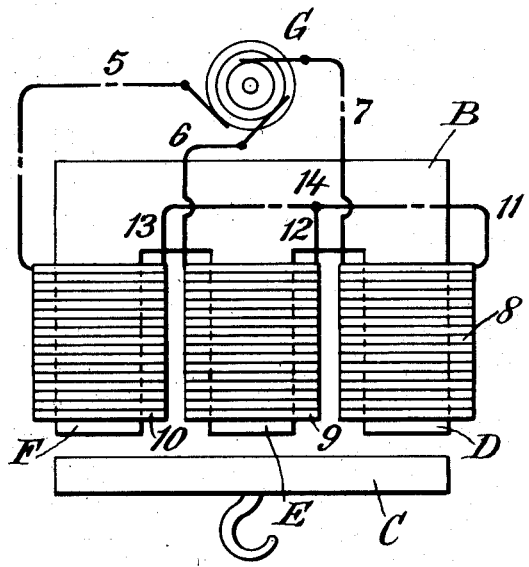
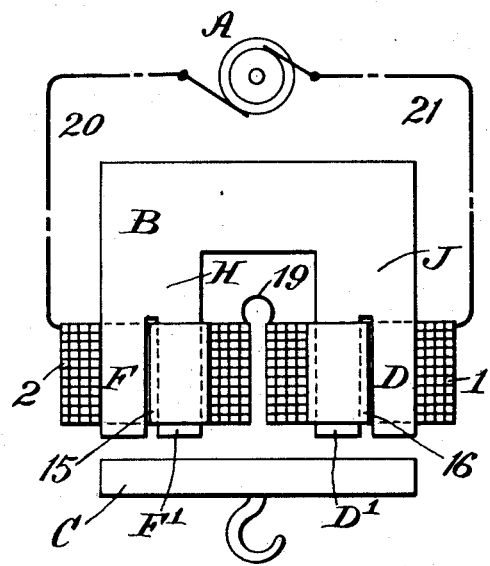
WITNESSES:
Frank O'Connor
A. E. Muir
INVENTOR
Winthrop K. Howe
BY Geo. H. Benjamin
ATTORNEY

UNITED STATES PATENT OFFICE.

WINTHROP KEITH HOWE, OF BUFFALO, NEW YORK, ASSIGNOR TO GENERAL RAILWAY SIGNAL COMPANY, A CORPORATION OF NEW YORK.

ELECTROMAGNET.

No. 880,888.     Specification of Letters Patent.     Patented March 3, 1908.

Application filed April 26, 1906. Serial No. 313,769.

*To all whom it may concern:*

Be it known that I, WINTHROP KEITH HOWE, a citizen of the United States, residing at Buffalo, county of Erie, State of New York, have invented certain new and useful Improvements in Electromagnets, of which the following is a specification.

This invention relates to certain new and useful improvements in electro magnets of the type adapted to be energized by alternating current and particularly to tractive electro magnets.

In previous designs it has been found that the variation of the flux due to the alternating current causes the armature to tend to release each time the flux passes through the zero value. This causes a chattering or vibration of the armature against the pole pieces, accompanied by a continuous noise and weakening of the pull. These features have in the past rendered electro magnets energized by alternating current objectionable and often impossible for use.

The object of my invention is to do away with all such vibrations and noise and increase the tractive power of the magnet.

In carrying out my invention, I employ magnetic fluxes differing in phase, but each producing a tractive effort upon the armature of the magnet. Since the phases of the fluxes employed are different, the tractive effort exerted upon the armature of the magnet by the field, will never pass through zero value, thus removing the cause of one of the principal objections to alternating current magnets.

The accompanying drawings will serve to illustrate my invention.

Figure 1, is a front elevation of an electro magnet and armature with the coils on the magnet connected in series with a source of single phase current and means for displacing the phases of the current of the magnets. The core is shown as provided with three legs. The two outside legs carry fluxes of displaced phase and the middle leg the resultant phase. Fig. 2, is a similar view with the coils of the magnets connected in multiple with a source of single phase current. Fig. 3, is a similar view with the coils of the magnets connected to a source of three-phase current. Fig. 4, is a vertical section, with the coils of the magnets in series with a source of single-phase current and a short-circuited coil arranged about one-half of each pole.

In Fig. 1, A indicates a source of single-phase alternating current; B, core of a tractive electro magnet having an armature C. The core B has three legs, D, E, F. A coil 1 is wound on leg D and a coil 2 on leg F. These coils are connected together by a conductor 3, and through their terminals, across a source of single-phase current A. The coils are in series.

4 is a resistance connected in shunt with the coil 1.

Owing to the fact that the vectorial sum of the currents in the coil 1 of the magnet D and the resistance 4, must be equal at all times to the current in the coil 2 magnet F, and since the resistance 4 is a non-inductive resistance and the coil 1 highly inductive (the coil 1 should be made of large wire) the current in coil 1 of the magnet D will lag in phase the current in coil 2 of magnet F. The flux in magnet D is in phase with the current in the coil of said magnet, and the flux in magnet F is similarly in phase with the current in the coil of this magnet. Now, since these magnetizing currents are displaced in phase, the corresponding magnetic fluxes in the two magnets D, F, will differ in phase from each other. It will, therefore, be obvious to anyone familiar with electro magnetism that the leg E of the core will carry the resultant or vectorial difference of the fluxes in the legs D and F. Consequently, as the legs D, E, F, carry fluxes displaced in phase from each other, each of these fluxes will exert a tractive effort upon the armature C, and inasmuch as these fluxes differ in phase, the net tractive effort exerted at any one instant will never be zero, thus doing away with the cause of vibration.

In Fig. 2, the coils 1, 2, are connected in parallel across a source of single-phase current A. The non-inductive resistance 4 is inserted in coil 1, as in Fig. 1, and coil 2 is connected directly across the generator. Coil 2 should be given a low power factor by using large wire and the circuit of this coil should be made as non-inductive as possible. In this way the phases of the current in the magnets D, F, will be displaced, producing displacements in the phases of the fluxes in the three legs D, E, F, of the core, as described in Fig. 1.

Fig. 3, shows a modification of the invention in which a three-phase generator supplies three-phase currents to the conductors 5, 6, 7. Coils 8, 9, 10, are mounted respectively on the three legs D, E, F, of the core B. These coils are shown as star-connected by conductors 11, 12, 13, which come together at a common neutral point, 14. It will be obvious that a delta-connection may be employed. By means of this arrangement and the consequent plurality of magnetic fluxes of different phase, the required condition as to the absence of vibration will be present as in Figs. 1 and 2.

In Fig. 4 the traction magnet has only two poles, D, F, which are split to form the polar ends D, D', and F, F'. Around the polar ends D, D', F, F', are wound the magnetizing conductors 1 and 2, which are in series with a single-phase generator A, and around the polar ends D', F', are disposed short-circuited shading coils 15 and 16. In the present instance, these shading coils are made from a strip of metal or annular piece slipped over the polar ends D', F'. The action of the shading coils 15, 16, on either pole piece, is to make the flux issuing from the portion of the pole piece inclosed by the shading coil, lag in phase behind the flux of the other half of the pole. Fluxes differing in phase from each other will, therefore, issue from each half of each pole, and the result of this will be as in the other figures, that the net magnetic pull will never be zero at any instant, and there will be entire freedom of vibration.

It will be plain to anyone skilled in the art that a great variety of modifications of my invention may be made which will involve the same principle, i. e.—combining the magnetic fluxes so that the resultant mechanical effort upon the armature will never become zero. For instance, several single-phase magnets of different phase from each other, may be mechanically combined to produce the same result. 1, 2 or 3 phase current may be employed, etc.

Having thus described my invention, I claim:

1. A traction magnet, comprising a magnetic core having a plurality of poles and provided with a number of magnetizing coils, and means whereby currents may flow in a local path or shunt-circuit through one of said coils.

2. A traction magnet, comprising a magnetic core having a plurality of legs wound with magnetizing coils and an auxiliary unwound leg, an armature coöperating with said magnetic core, and means for displacing the phase of the currents in said coils and providing a shunt-circuit for one of the coils.

3. A traction magnet, comprising a magnetic core having a plurality of poles, coils thereon adapted to be connected to a source of alternating currents, and means for causing currents to flow in local circuits about the magnet core, whereby the magnetism in part of the core is retarded to cause a continuous attraction of the armature.

In testimony whereof, I affix my signature, in the presence of two witnesses.

WINTHROP KEITH HOWE.

Witnesses:
 F. L. DODGSON,
 C. J. LEWIS.